United States Patent
Ajiki

(10) Patent No.: US 6,914,185 B2
(45) Date of Patent: Jul. 5, 2005

(54) ENAMELED WIRE, METHOD OF SOLDERING THE WIRE AND ELECTRO-ACOUSTIC TRANSDUCER

(75) Inventor: Kenichi Ajiki, Mie (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 10/069,592

(22) PCT Filed: Jun. 29, 2001

(86) PCT No.: PCT/JP01/05628
§ 371 (c)(1),
(2), (4) Date: Jul. 16, 2002

(87) PCT Pub. No.: WO02/01579
PCT Pub. Date: Jan. 3, 2002

(65) Prior Publication Data
US 2003/0019656 A1 Jan. 30, 2003

(30) Foreign Application Priority Data
Jun. 29, 2000 (JP) .................... 2000-196088

(51) Int. Cl.$^7$ ............... H01B 7/34; H01B 7/00
(52) U.S. Cl. ............ 174/36; 174/110 R; 174/110 SR; 174/120 R
(58) Field of Search .............. 174/36, 110 R, 174/110 SR, 110 N, 110 P, 110 E, 110 H, 120 SR; 381/205, 345–347, 351, 368, 377, 420, 423, 429

(56) References Cited

U.S. PATENT DOCUMENTS

| 4,631,237 | A | * | 12/1986 | Dommer et al. ............ 428/621 |
| 4,686,153 | A | * | 8/1987 | Tominaga et al. .......... 428/610 |
| 4,808,966 | A | * | 2/1989 | Ferlier et al. ............... 338/214 |
| 5,337,941 | A | * | 8/1994 | Higashiura et al. ......... 228/205 |
| 5,532,434 | A | * | 7/1996 | Takeno et al. ........... 174/110 R |
| 6,239,376 | B1 | * | 5/2001 | Kimura et al. .......... 174/110 R |

FOREIGN PATENT DOCUMENTS

| JP | 3-221998 | 9/1991 |
| JP | 07-234686 | 9/1995 |
| JP | 9-200895 | 7/1997 |
| JP | 11-121501 | 4/1999 |

* cited by examiner

Primary Examiner—William H. Mayo, III
(74) Attorney, Agent, or Firm—Wenderoth, Lind & Ponack, L.L.P.

(57) ABSTRACT

An enameled wire with an insulating coated layer of high laser beam absorption and with a melting layer transparent to the laser beam. The high laser beam absorption makes stripping of the insulating coating layer easy without increasing an output of the laser beam extremely large. As a result, possible wire breakage at soldering can be avoided and soldering reliability improves in assembling the small electro-acoustic transducers. An electro-acoustic transducer of the present invention is provided in the resin-molded body with an empty space in at least a place underneath a portion of soldering land, on which a laser beam is irradiated. Apparatus comprising the electro-acoustic transducer of the present invention can provide a well-stabilized soldering quality and a high reliability.

8 Claims, 6 Drawing Sheets

ENAMELED WIRE, METHOD OF SOLDERING THE WIRE AND ELECTRO-ACOUSTIC TRANSDUCER

TECHNICAL FIELD

The present invention relates to an enameled wire for use as a coil of small and light-weight electro-acoustic transducers such as a micro speaker, a receiver, a sounder or the like, built in a portable telephone unit or the like mobile communication apparatus. The present invention also includes a method of soldering the enameled wire, as well as an electro-acoustic transducer employing it the wire.

BACKGROUND ART

A conventional technology used for manufacturing an electro-acoustic transducer is described with reference to FIG. 5 through FIG. 7.

FIG. 5 shows a cross sectional side view of a sounder for use in a mobile communication apparatus. FIG. 6 is a cross sectional view of an enameled wire for forming a coil, which is a key portion of the sounder. FIG. 7 is a perspective view used to describe how the enameled wire is soldered by virtue of laser irradiation.

Referring to FIG. 5, an enameled wire 1 is wound to form a coil 1a disposed on a plate 3 having a central pole 2. A terminal 4 is resin-molded in a bottom case 4a with at least a soldering portion of the terminal exposed outside of the bottom case. The terminal is provided at the exposed portion with a land for connection with the enameled wire 1. A ring-shaped magnet 5 is fixed on the plate 3. Above the magnet 5 is a diaphragm 6, which is disposed with a certain clearance from the magnet 5. A small piece of magnetic material is attached on the diaphragm 6 at a center of the diaphragm. An upper case 7 is provided with a sound radiation hole 8.

Enameled wire 1 constituting the coil 1a is described with reference to FIG. 6. The enameled wire wire 1 includes a core wire 1b of copper or an copper alloy, which is covered around an outer surface thereof with an insulating film 1c, and a hot-melt layer 1d covers the insulating film 1c.

During winding of the enameled wire around the central pole 2 for forming the coil 1a, the hot-melt layer 1d is softened or melted by hot air blown thereto, or by another manner. When heating with hot air is stopped, the hot-melt layer 1d solidifies again, and as a result the enameled wire 1 stays in a coiled shape.

An end part of enameled wire 1 forming the coil 1a is soldered to the terminal 4 after the insulating film 1c is stripped.

A generally practiced process of soldering is either; stripping the insulating film 1c using a $CO_2$ laser or the like before soldering, and then soldering the wire; or performing stripping and the soldering at the same time using a laser beam.

A method where stripping the insulating film 1c and soldering of the wire are performed simultaneously with a laser beam is described below with reference to FIG. 7.

A conventional soldering apparatus consists mainly of a laser oscillator 10, an optical fiber 11, a projection lens 12 and a solder string 13. A laser beam from the laser oscillator 10 is led via the optical fiber 11 to the projection lens 12 to be projected to an exterior thereof. The laser beam is absorbed by the land of terminal 4 and the enameled wire 1, and the beam is converted into thermal energy. When the land of terminal 4 is heated to reach a solder melting temperature, the solder string 13 is delivered thereto. Heat energy provided for soldering removes the hot-melt layer 1d and the insulating film 1c by melting, evaporation or sublimation, and solders the enameled wire 1 to the land.

In the above-described method of soldering, where an insulating film and hot-melt layer are stripped away prior to soldering, cost of bonding tends to increase because of increased process steps required for soldering. In addition, a $CO_2$ laser used for stripping the insulating film 1c readily oxidizes the land, and as a result, a wetting property of the land against solder deteriorates.

In a method where stripping of insulating film 1c and soldering of wire 1 are conducted simultaneously by laser beam irradiation, since the normally-used core wire 1b of enameled wire 1 is as fine as 0.1 mm in diameter, the enameled wire 1 easily breaks by a slightly increased output of a laser beam which leads to an excessive generation of heat energy. On the other hand, if the heat energy is insufficient, the insulating film 1c is stripped imperfectly, which tends to cause soldering troubles such as a tunneling solder, or the like.

As described in the foregoing, a conventional soldering method using a laser beam has a drawback in that it requires a precise process control.

The present invention addresses the above problems and aims to provide an enameled wire with which a time needed for laser-soldering a wire on a soldering land can be shortened, and a rate of occurrence of tunneling solder and other soldering troubles can be decreased. The present invention also includes a method of soldering an enameled wire, as well as a soldering apparatus using the enameled wire of the present invention.

SUMMARY OF THE INVENTION

In an enameled wire of the present invention, an insulating coated layer is colored for a better absorption of a laser beam, while a hot-melt layer is transparent to the laser beam. When soldering an enameled wire of the present invention with a laser beam, the insulating coating layer can be stripped away without making output of a laser very high, since an absorption of an irradiated laser beam is high in the insulating coated layer. As a result, a trouble of a broken enameled wire can be avoided, and reliability of soldering between an end of the enameled wire and a soldering land is improved.

An electro-acoustic transducer of the present invention includes a vacant space provided in a resin molded body at least in a part underneath a soldering land. With an electro-acoustic transducer of the present invention, efficiency of laser beam utilization increases and soldering quality and the reliability improve.

DESCRIPTION OF THE PREFERRED EMBODIMENTS

Figure 1:
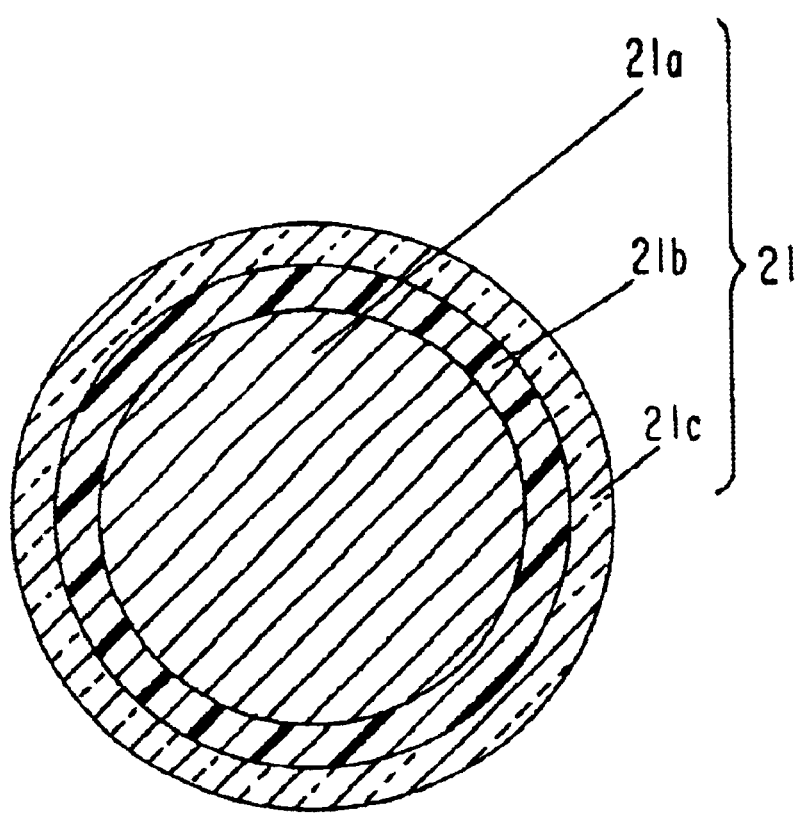
FIG. 1 is a cross sectional view of an enameled wire having an insulating coated layer in accordance with an exemplary embodiment of the present invention.

An enameled wire 21 in accordance with the present invention, a method of soldering the enameled wire, as well as a soldering apparatus, are described in the following with reference to FIG. 1 through FIG. 4. Portions using the same conventional technology are represented by the same reference numerals used for the prior art, and descriptions of such portions are omitted. The enameled wire 21 is wound into a coil through a conventional technology, so description of a coiling method is omitted here.

First Embodiment 1

Figure 2:
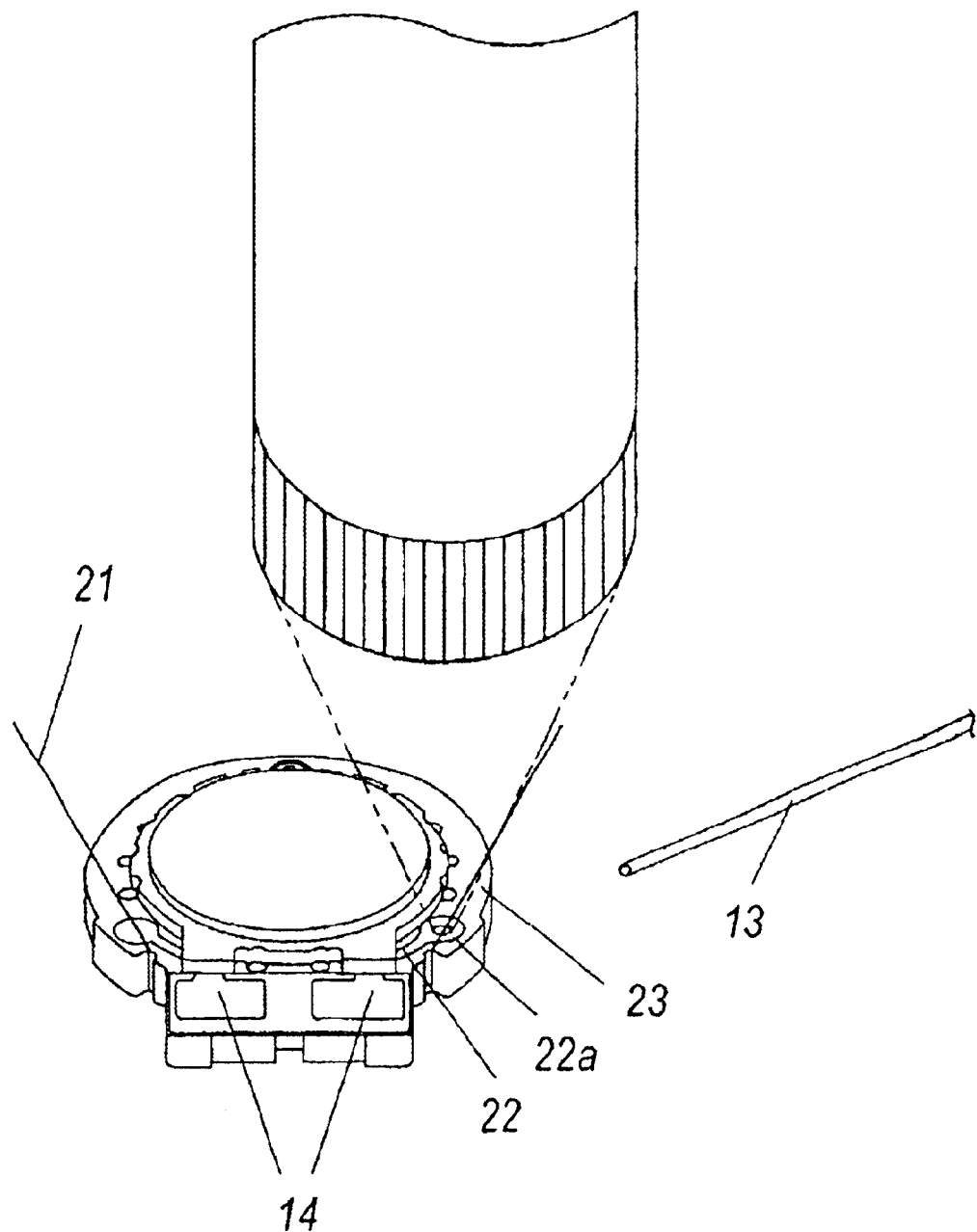
FIG. 2 is a perspective view used to describe a soldering of the enameled wire by laser beam irradiation.
Figure 3:
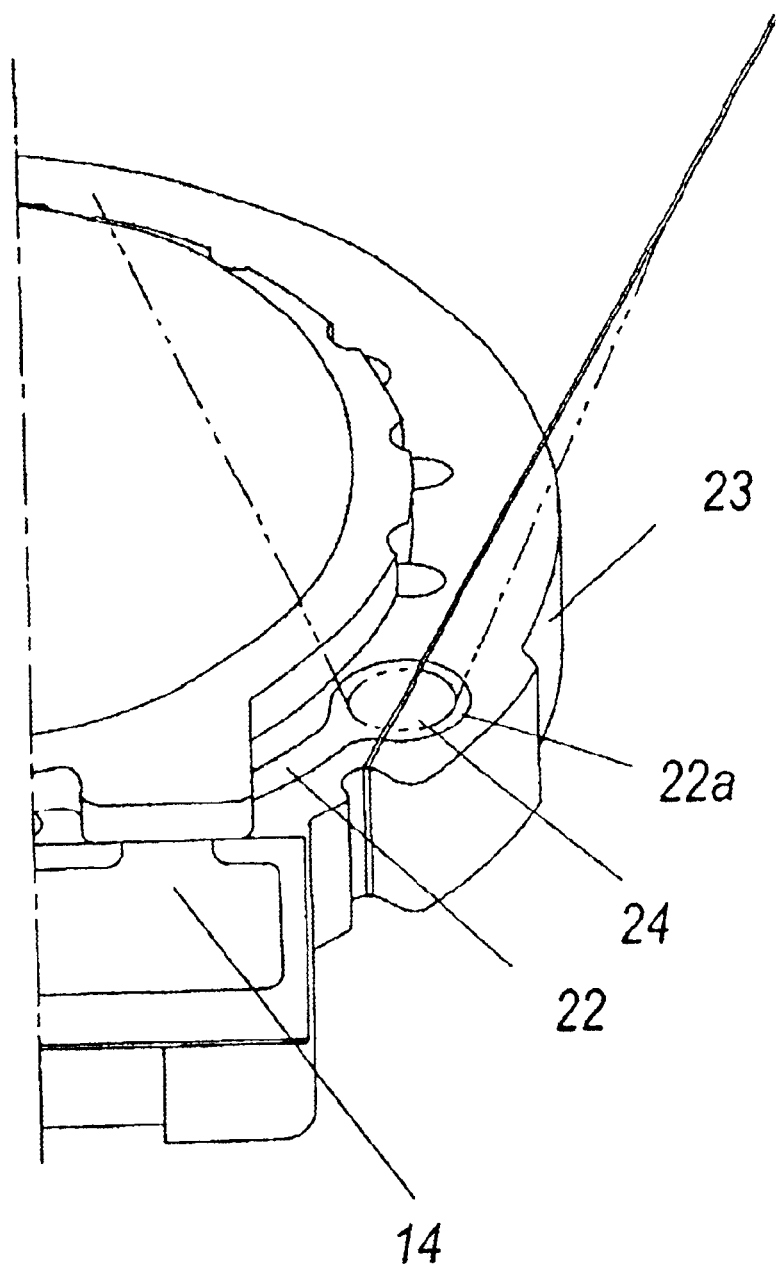
FIG. 3 is a perspective view showing a relationship between size of a soldering land and diameter of a laser beam spot.

FIG. 1 shows a cross sectional view of an enameled wire manufactured in accordance with an exemplary embodiment of the present invention. FIG. 2 is a perspective view showing how the wire is soldered. FIG. 3 is a perspective view used to show a relationship between size of soldering land and diameter of a laser beam spot.

Referring to FIG. 1, an enameled wire 21 comprises a core wire 21a made of copper or a copper alloy, an insulating coated layer 21b of colored polyurethane resin covering an outer surface of core wire 21a, and a transparent hot-melt layer 21c covering an outer surface of the insulating coated layer 21b.

A method of soldering the above-configured enameled wire 21 on a land of terminal 14 by virtue of laser irradiation is described referring to FIG. 2.

In FIG. 2, a land 22 is made of a thin metal sheet, and is provided with a soldering portion 22a. A molded resin case 23 is formed integrally with a terminal 14 so that a surface of land 22 is exposed to an exterior of the case.

A soldering experiment was conducted with the enameled wire 21 of the present invention using a $CO_2$ laser under specific laser irradiation conditions. In the experiment, stripping of the insulating coated layer 21b and soldering were performed simultaneously. Results of the experiment show that there was no soldering problems (number of samples: N=300).

Whereas, in the same experiment conducted under the same conditions using a conventional enameled wire, one sample was rejected due to bad soldering (N=200). Thus, it has been confirmed that soldering trouble was eliminated by the use of an enameled wire 21 of the present invention.

A supposed reason for the eliminated soldering trouble is that color of the insulating coated layer 21b in the present exemplary embodiment is green, while insulating film 1c of conventional enameled wire 1 is transparent to the laser beam. Stated otherwise, where the insulating film 1c of the conventional enameled wire 1 is transparent to a laser beam, the insulating coated layer 21b of the enameled wire 21 of the invention is non-transparent to the laser beam. The green-color insulating coated layer 21b efficiently absorbed an irradiated laser beam; as a result, the insulating coated layer was surely melted and stripped away, and the core wire 21a of enameled wire 21 had good contact with molten solder. This seems to be a reason why the enameled wire 21 and the soldering portion 22a are connected in a stable manner.

Although the insulating coated layer 21b in the present embodiment has a green color, blue-colored layers also exhibited the same effects. Thus, colors given to the insulating coated layer 21b help increase absorption of a laser beam so as to heat this layer effectively. It seems that an insulating coated layer 21b was melted and stripped away thoroughly, and soldering finished well, by taking advantage of the above-described factors, without irradiating a high amount of laser beam energy.

An insulating coated layer 21b may be colored by any conventional manner using a dye or a pigment. An absorption wavelength of such coloring is not required to be existent within a range of visible lights. Namely, coloring is effective also for a YAG laser, $CO_2$ laser or other kinds of lasers whose oscillation wavelength is not within the range of visible lights. In this case, the insulating coated layer should be provided with a coloring that has an absorption band corresponding to this oscillation wavelength.

Although in the present embodiment a $CO_2$ laser apparatus was used because of its general availability and high energy, high output semiconductor lasers may of course be used instead, which oscillate beams in red, green, ultraviolet or other colors.

It is to be noted too, that once melting/stripping is initiated at a part of insulating coated layer 21b, a stripped area is expanded by a molten solder, and as a result soldering can be completed well.

Furthermore, as shown in FIG. 3, when a soldering portion 22a of land 22 is made to have a same shape as that of laser beam spot 24, unwanted heat diffusion can be avoided to obtain a highest heating efficiency. This leads to a shorter soldering time.

Still further, soldering time can be shortened by making a size of soldering portion 22a of land 22 approximately identical to that of laser beam spot 24. Under such a configuration, heat diffusion can be suppressed and heating efficiency is maximized.

Second Embodiment

Figure 4:
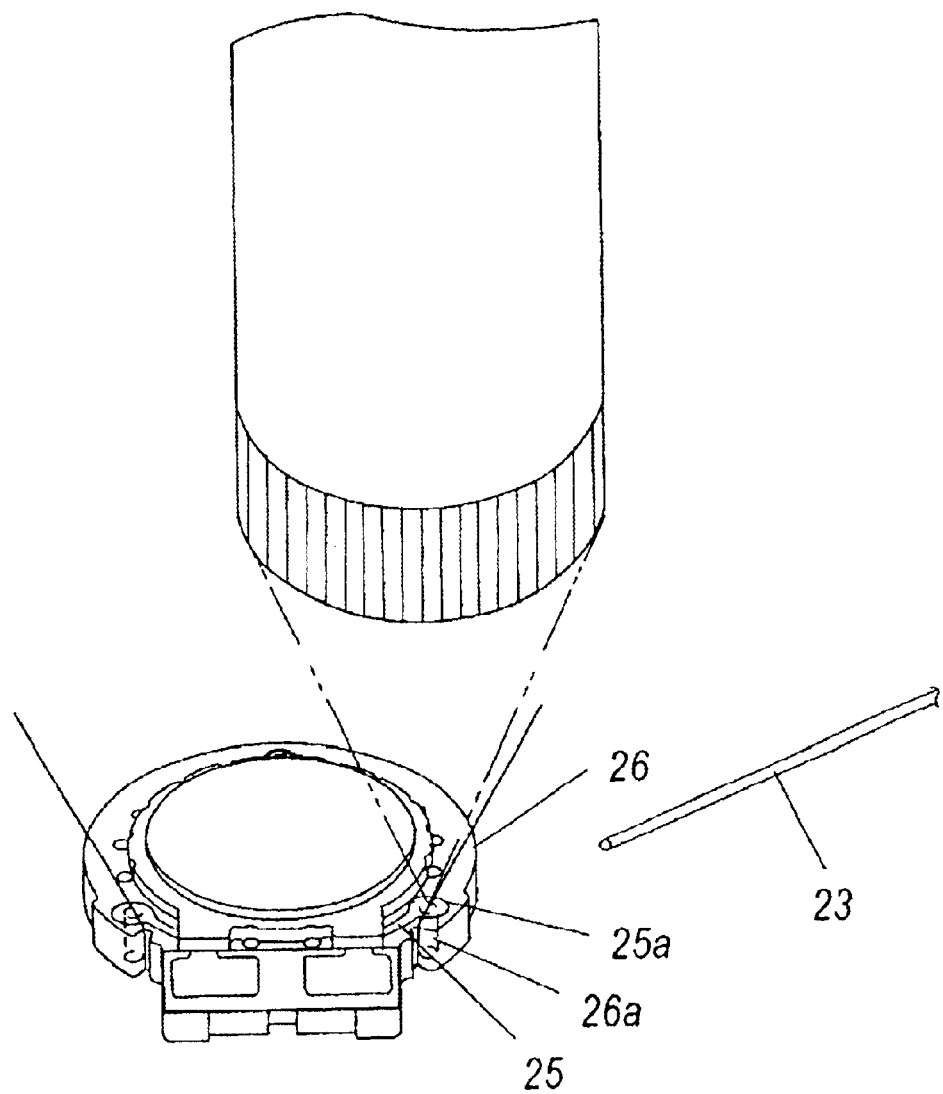
FIG. 4 is a perspective view of a molded resin case provided in accordance with another exemplary embodiment of the present invention.
Figure 5:
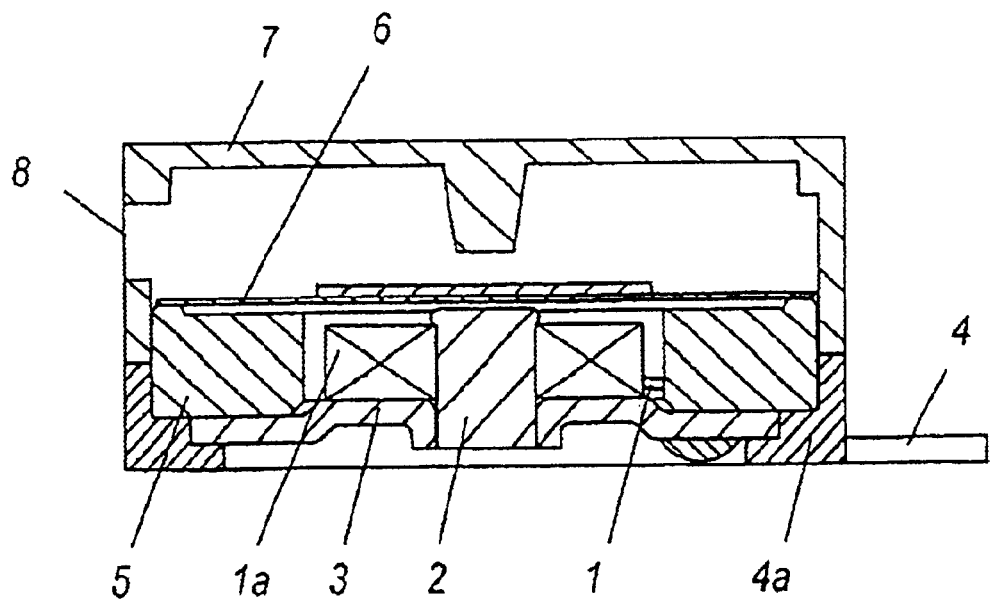
FIG. 5 is a cross sectional side view of a conventional sounder.
Figure 6:
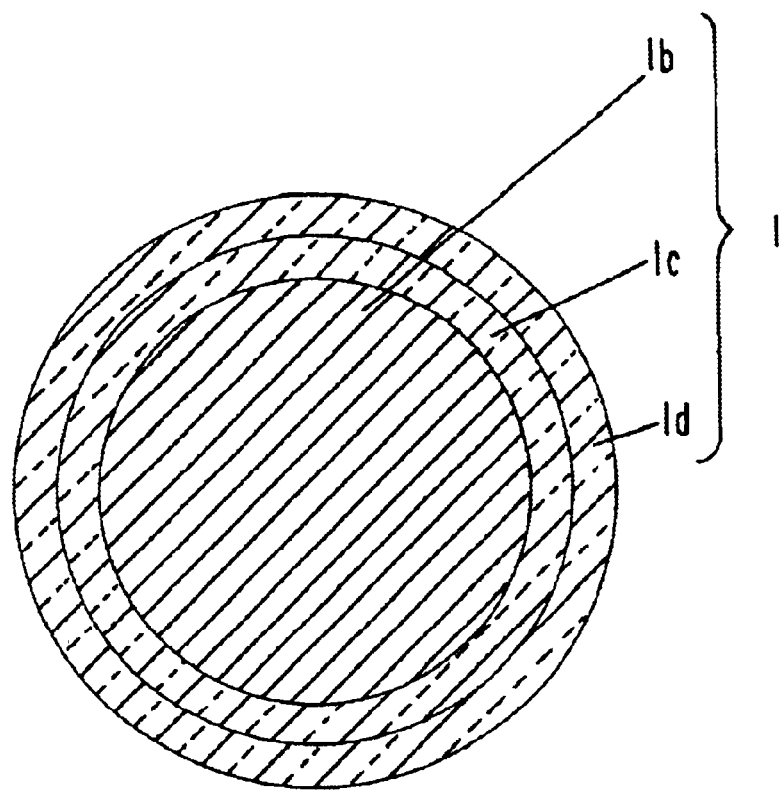
FIG. 6 is a cross sectional view of a conventional enameled wire.
Figure 7:
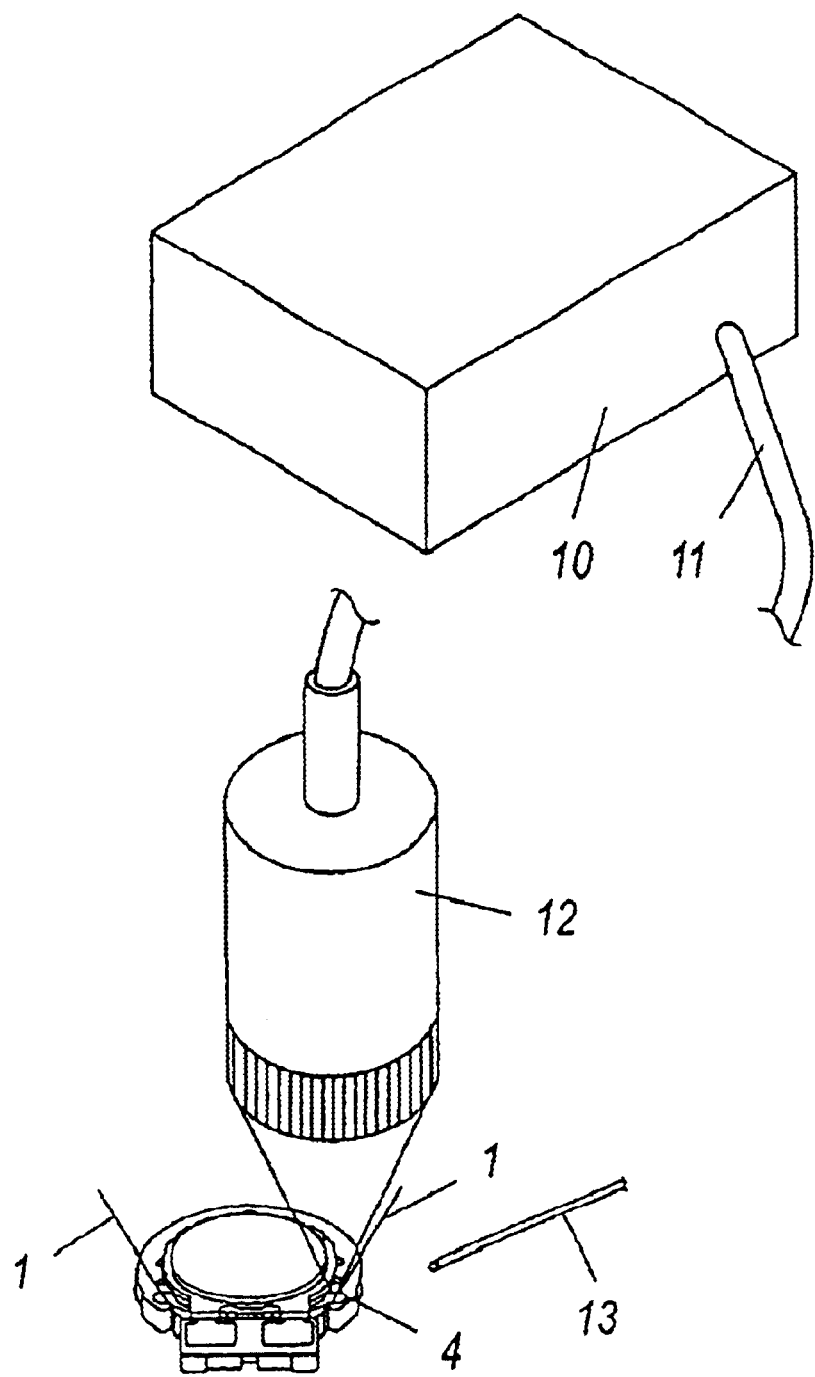
FIG. 7 is a perspective view describing how soldering is performed using a laser beam irradiation.

FIG. 4 is a perspective view of a resin case of a receiver provided in accordance with another exemplary embodiment of the present invention. FIG. 4 shows how soldering is performed on a soldering land which is made of a thin metal sheet molded in resin.

Referring to FIG. 4, a molded resin case 26 is provided with an empty space 26a underneath a soldering portion 25a of land 25. The empty space 26a is provided in order to suppress diffusion of heat, caused by a laser beam spot irradiation, into the resin case 26, and to further increase efficiency of soldering. The empty space 26a may penetrate through the resin case 26 to a bottom surface, in which case, the empty space can be utilized also as a screw hole for fixing a member to the resin case.

There can be another manner for improving the heating efficiency, and hence shortening soldering time. Land 25 may be plated with a solder or tin, or provided with a flux layer on a surface to increase a laser beam spot absorption. By so doing, reliability of soldering may also be improved.

Though, in the foregoing descriptions only a hot-melt layer of an enameled wire has been explained, it should be noticed that this melting layer is not limited to a hot-melt type. The present invention may employ enameled wires having a melting layer which is softened or glued by a solvent, or a self-adhesive layer can be used for the same purpose. Also, in the foregoing descriptions the hot-melt layers have been described to be transparent to the laser beam spot. However, it is not required that the layer is totally transparent; but, what is essential is that a hot-melt layer absorbs less of a laser beam than does an insulating coated layer surrounded by the hot-melt layer.

A soldering method of the present invention can be applied on those enameled wires having no melting layer.

INDUSTRIAL APPLICABILITY

An enameled wire having an insulating coated layer in accordance with the present invention can be stripped of the insulating coated layer efficiently by a laser beam spot irradiation during a soldering process. As a result, stripping of the insulating coated layer and the soldering can be conducted simultaneously, whereby use of an enameled wire of the present invention can shorten a time needed for a soldering during assembly of an apparatus. Problems due to bad soldering, such as a tunneling soldering, can also be reduced. Thus, the enameled wire of the present invention is expected to make a significant contribution in manufacturing productivity as well as in reliability of electric devices including electro-acoustic transducers and the like.

What is claimed is:

1. An electro-acoustic transducer comprising:
   a plate having a central pole;
   a coil on said plate, said coil including an enameled wire having
      (i) a copper or copper alloy core wire,
      (ii) an insulating coated layer covering said core wire, said insulating coated layer being for efficiently absorbing a laser beam so as to be melted and stripped away upon absorbing the laser beam, and
      (iii) a melting layer covering said insulating coated layer;
   a magnet fixed on said plate;
   a diaphragm above said magnet and spaced from said central pole, said diaphragm having a magnetic material thereon;
   a molded resin body; and
   a terminal for connection to said enameled wire, said terminal having a soldering portion on an exterior thereof and being molded to said molded resin body,
   wherein said molded resin body includes an empty space underneath at least a portion of said soldering portion.

2. The electro-acoustic transducer according to claim 1, wherein said insulating coated layer is for efficiently absorbing the laser beam by comprising a colored resin.

3. The electro-acoustic transducer according to claim 1, wherein said insulating coated layer is for efficiently absorbing the laser beam by comprising a material colored with a dye or pigment.

4. The electro-acoustic transducer according to claim 1, wherein said insulating coated layer is for efficiently absorbing the laser beam by being non-transparent to the laser beam.

5. The electro-acoustic transducer according to claim 1, wherein said insulating coated layer is for efficiently absorbing the laser beam by being of a color that has an absorption band corresponding to an oscillation wavelength of a laser used to generate the laser beam.

6. The electro-acoustic transducer according to claim 1, wherein said insulating coated layer is for efficiently absorbing the laser beam by being for absorbing more of the laser beam than said melting layer is to absorb.

7. The electro-acoustic transducer according to claim 1, wherein
   said insulating coated layer contacts said core wire.

8. A method of soldering an enameled wire, comprising: irradiating a laser beam to an enameled wire that includes
   (i) a copper or copper alloy core wire,
   (ii) an insulating coated layer covering said core wire, said insulating coated layer being for efficiently absorbing said laser beam so as to be melted and stripped away upon absorbing said laser beam, and
   (iii) a melting layer covering said insulating coated layer, thereby melting and stripping away at least part of said insulating coated layer and soldering said core wire to a soldering portion having an empty space therebeneath.

* * * * *